United States Patent [19]

Katz et al.

[11] 4,375,437

[45] Mar. 1, 1983

[54] METHOD OF REMOVING DIOXANE FROM PHOSPHATE ESTER SURFACTANTS

[75] Inventors: Michael M. Katz, New City, N.Y.; Mohamed M. Hashem, Wayne, N.J.; Charles P. Talley, Staten Island, N.Y.

[73] Assignee: GAF Corporation, New York, N.Y.

[21] Appl. No.: 274,703

[22] Filed: Jun. 16, 1981

[51] Int. Cl.³ .................................................. C07F 9/09
[52] U.S. Cl. .................................... 260/990; 260/950; 260/951
[58] Field of Search ............. 260/990, 951 (U.S. only)

[56] References Cited

U.S. PATENT DOCUMENTS 2,573,658  10/1951  Weesner ............................. 260/990
2,853,471   9/1958  Beadell .............................. 260/951

Primary Examiner—Anton H. Sutto
Attorney, Agent, or Firm—J. Magee, Jr.; J. Gary Mohr

[57] ABSTRACT

Dioxane contaminant is removed from a phosphate ester surfactant having a chain of repeating ethyleneoxy units and containing residual phosphoric acid by means of a process which involves mixing the phosphate ester surfactant with a sufficient quantity of a neutralization agent of substantially completely neutralize residual phosphoric acid contained in said surfactant, and then separating dioxane from said phosphate ester surfactant until the dioxane level is below about 10 ppm. The neutralization agent can be a base such as sodium hydroxide.

12 Claims, No Drawings

METHOD OF REMOVING DIOXANE FROM PHOSPHATE ESTER SURFACTANTS

BACKGROUND OF THE INVENTION

1. Field of the Invention

The invention relates to a method of removing dioxane from phosphate ester surfactants.

2. Brief Description of the Prior Art

Compounds which are made by the polymerization of ethylene oxides or which contain a chain of ethylenoxy units usually contain varying amounts of dioxane. Dioxane removal typically consists of a distillation operation or sparging with a suitable gas at a suitable temperature. However, the dioxane levels cannot always be reduced to the 5 to 10 ppm range which is required for numerous applications.

SUMMARY OF THE INVENTION

It has now been found that the level of dioxane contaminant in phosphate esters can be reduced to at least as low as 5–10 ppm or below through the use of a base in combination with sparging or vacuum stripping. The process involves adding at least a stoichiometric amount of a base, relative to the amount of residual phosphoric acid in the phosphate ester, to the phosphate ester solution and subjecting the solution to a dioxane stripping operation as for example, by air sparging or vacuum stripping.

DESCRIPTION OF THE PREFERRED EMBODIMENTS

The phosphate ester hydrophobe surfactants are at best difficult to define by specific names or exact formulas due to the complexity of the phosphoros chemistry. However, they are well defined in patents and publications and are commercially available, as for example under the registered trademark GAFAC, a trademark of the GAF Corporation. Typical product designations are GAFAC PE 510, RE 610, RS 410 and RS 510.

The phosphate ester surfactants to which the instant invention applies can be of the general type R-O $PO_3H_2$ and $(R-O)_2$ $PO_2H$ where R represents an alkyl radical or an alkyl aryl radical which has been modified by the addition of alkylene oxides. From 3 to 10 repeating ethylenoxy units are commonly found in commercial products. More detailed type formulas and additional background is disclosed in the article Phosphate Surfactants—Properties and Uses by R. L. Mayhew and Fred Krupin, SOAP and CHEMICAL SPECIALITIES, April 1962, pages 55, 56, 57, 58, 94 and 95, which disclosure is incorporated herein by reference.

Additional background can be found in SURFACE ACTIVE ETHYLENE OXIDE ADDUCTS by N. Schonfeldf, Ph.D., pgs. 655 to 659, Published by Pergamon Press, 1969. The subject matter of this publication is incorporate herein by reference. Further background are is found in NON IONIC SURFACTANTS, edited by M. J. Schick, Marcel Dekkap Inc., New York, 1966, pgs. 384 to 388, the disclosure of which is incorporated herein by reference.

It has been found that in some instances that sparging or vacuum distillation can effectively reduce the dioxane level of the phosphate ester surfactant to a level below 5 ppm, whereas in other instances the same procedure fails to achieve the desired reduction of the dioxane level. Unexpectedly, the dioxane can be consistently reduced to the desired level if a determination is made of the amount of free phosphoric acid which is present and a sufficient quantity of a neutralization agent is used to inactivate the phosphoric acid. The neutralization agent can be a base such as sodium hydroxide.

The term "base" as employed herein is intended to broadly include any compound which has the ability to react with acids to form a salt, thereby neutralizing the acid. Theoretical explanation of the invention is that dioxane is weakly bound to the residual phosphoric acid in the phosphate ester thereby precluding dioxane removal below about the 10 ppm level. The NaOH or other neutralizing agent binds with the phosphoric acid thereby liberating the more weakly bound dioxane. While NaOH is one neutralizing agent that can be used other bases may be used.

EXAMPLE I

A phosphate ester surfactant having a nonyl phenol poly(ethylenoxy) base with about 9 or 10 ethylenoxy units, about a 0.41% residual phosphoric acid and 119 ppm dioxane content, was divided into three aliquots.

Portion one was vacuum stripped for six hours at 90° C. and 10 mm Hg vacuum. The dioxane level was determined to be 10 ppm at the completion of the stripping operation.

EXAMPLE II

A second portion of the phosphate ester surfactant of Example I was vacuum stripped under the conditions of Example I, except that the solution further contained 1% NaOH. At the end of the operation no dioxane was found at a lower detection limit of 0.5 ppm.

EXAMPLE III

The phosphate ester surfactant and operating conditions of Example I, were employed except that 1% $H_3PO_4$ was added. The residual dioxane level was 15 ppm.

EXAMPLE IV

A first aliquot sample of phosphate ester surfactant containing 124 ppm dioxane and 0.37% residual phosphoric acid was vacuum stripped in accordance with the procedure of Example I. The residual dioxane was 12 ppm.

EXAMPLE V

The second aliquot sample of the phosphate ester surfactant of Example IV was vacuum stripped in accordance with the procedure of Example II. The residual dioxane level was 8 ppm.

EXAMPLE VI

A phosphate ester surfactant having 0.93 residual phosphoric acid and 320 ppm dioxane contaminant was air sparged for eight hours at 90° C. The resultant dioxane level was 40 ppm.

EXAMPLE VII

A phosphate ester surfactant having 0.93% residual phosphoric acid and 340 ppm of dioxane was mixed with 1% NaOH and air sparged for eight hours at 90° C. The resultant dioxane level was 6 ppm.

EXAMPLE VIII

A sample of a phosphate ester surfactant having a tridecyloxy poly(ethylenoxy) base and containing 121 ppm dioxane was divided into four aliquot samples. The poly(ethylenoxy) had about 9 or 10 repeating units. The first sample was sparged with nitrogen for five hours at 95° C. at atmosphere pressure. The residual dioxane level at the end of five hours was determined to be 4.7 ppm.

EXAMPLE IX

Aliquot sample two of the phosphate ester of Example IX was sparged under the same conditions as set forth in Example X, except that 1% water was added. The residual dioxane level was 1.1 ppm.

EXAMPLE X

A third aliquot sample of the phosphate ester of Example IX was sparged under the same conditions as the first aliquot sample, except that one percent NaOH was added. The resultant dioxane level was 0.6 ppm.

EXAMPLE XI

The fourth aliquot sample of the phosphate ester of Example IX was sparged under the same conditions as the first aliquot sample, except that one half percent NaOH and one half percent water were added. The resultant sparged product contained no detectable dioxane.

It should be noted that air sparging and vacuum stripping are well known, conventional procedures and require no further description. All analysis above 10 ppm dioxane were performed by direct GC injection and below 10 ppm dioxane were performed by the Modified Birkel Method.

The term "percent" should be understood to refer to weight percent unless otherwise defined.

What is claimed is:

1. The method of removing dioxane contaminant from a phosphate ester surfactant have a chain of repeating ethyleneoxy units and containing residual phosphoric acid, comprising the steps of:
   (a) mixing the phosphate ester surfactant with a sufficient quantity of a neutralization agent to substantially completely neutralize residual phosphoric acid contained in said surfactant, and
   (b) separating dioxane from said phosphate ester surfactant until the dioxane level is below about 10 ppm.
2. The method of claim 1, wherein said neutralization agent is a base.
3. The method of claim 2, wherein said base is sodium hydroxide.
4. The method of claim 1, wherein the said phosphate ester surfactant is tridecyloxy poly(ethylenoxy) phosphate.
5. The method of claim 1, wherein said phosphate ester surfactant is an alkyl aryl poly(ethylenoxy) phosphate.
6. The method of claim 1, wherein said phosphate ester surfactant is an alkyl phenyl poly(ethylenoxy) phosphate.
7. The method of claim 6, wherein said alkyl phenyl poly(ethylenoxy) phosphate is nonyl phenyl poly(ethylenoxy) phosphate.
8. The method of claim 1, wherein the neutralization agent is up to about two percent by weight of an aqueous solution of sodium hydroxide.
9. The method of claim 1, wherein said separating of dioxane from said phosphate ester comprises the step of sparging.
10. The method of claim 9, wherein said sparging employs air.
11. The method of claim 9 wherein said sparging employs nitrogen.
12. The method of claim 1, wherein said separating of dioxane from said phosphate ester comprises the step of vacuum distillation.

* * * * *